(12) United States Patent
Wakuta et al.

(10) Patent No.: US 12,005,853 B2
(45) Date of Patent: Jun. 11, 2024

(54) SEATBELT ANCHOR MOUNTING STRUCTURE

(71) Applicant: TOYOTA JIDOSHA KABUSHIKI KAISHA, Toyota (JP)

(72) Inventors: Yoshiyuki Wakuta, Nagoya (JP); Hiroyuki Tsubokawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/115,287

(22) Filed: Feb. 28, 2023

(65) Prior Publication Data

US 2023/0339426 A1 Oct. 26, 2023

(30) Foreign Application Priority Data

Apr. 21, 2022 (JP) ................................. 2022-069871

(51) Int. Cl.
*B60R 22/22* (2006.01)
(52) U.S. Cl.
CPC .................................. *B60R 22/22* (2013.01)
(58) Field of Classification Search
CPC .................................................... B60R 22/22
See application file for complete search history.

(56) References Cited

U.S. PATENT DOCUMENTS

| | | | | |
|---|---|---|---|---|
| 5,609,386 A * | 3/1997 | Takahashi | ............... | B62D 25/20 296/30 |
| 6,485,055 B1 * | 11/2002 | Swayne | ............... | B60N 2/2806 280/801.1 |
| 6,634,710 B1 * | 10/2003 | Adamson, Sr. | ........ | B60N 2/015 297/250.1 |
| 7,717,487 B2 * | 5/2010 | Kurokawa | ............... | B60N 2/06 296/65.13 |
| 9,650,082 B2 * | 5/2017 | Cao | ......................... | B60R 22/22 |
| 2016/0001822 A1 * | 1/2016 | Cao | ......................... | B60R 22/22 296/193.07 |
| 2023/0311807 A1 * | 10/2023 | Hayakawa | ............... | B60R 22/22 280/801.1 |

FOREIGN PATENT DOCUMENTS

| | | | | | |
|---|---|---|---|---|---|
| CN | 101400563 A | * | 4/2009 | ............. | B60G 11/15 |
| CN | 210502903 U | * | 5/2020 | | |
| DE | 102010018638 A1 | * | 11/2011 | ............. | B60R 22/22 |
| JP | 2000-052919 A | | 2/2000 | | |
| JP | 2000052919 A | * | 2/2000 | | |
| JP | 2009184590 A | * | 8/2009 | ............. | B60K 15/06 |
| JP | 2017210155 A | * | 11/2017 | | |
| KR | 19990021351 U | * | 6/1999 | | |
| KR | 20010060920 A | * | 7/2001 | | |
| KR | 20020047465 A | * | 6/2002 | | |
| WO | WO-2022209616 A1 | * | 10/2022 | | |

* cited by examiner

*Primary Examiner* — Barry Gooden, Jr.
(74) *Attorney, Agent, or Firm* — Dinsmore & Shohl LLP

(57) ABSTRACT

The seatbelt anchor mounting structure includes a floor panel to which a seat belt anchor is attached, a cross member disposed on a lower side of the floor panel, and a reinforcement disposed on a lower side of the floor panel and fixed to the seat belt anchor together with the floor panel. The reinforcement is fixed to the cross member at a position above an anchor attachment point, which is an attachment point of the seat belt anchor to the floor panel, and is fixed to the cross member at a position below the anchor attachment point.

5 Claims, 9 Drawing Sheets

SEATBELT ANCHOR MOUNTING STRUCTURE

CROSS-REFERENCE TO RELATED APPLICATION

This application claims priority to Japanese Patent Application No. 2022-069871 filed on Apr. 21, 2022, incorporated herein by reference in its entirety.

BACKGROUND

1. Technical Field

The present disclosure relates to a seatbelt anchor mounting structure in which a reinforcement is fixed to a seatbelt anchor together with a floor panel.

2. Description of Related Art

Japanese Unexamined Patent Application Publication No. 2000-52919 (JP 2000-52919 A) discloses a seatbelt anchor mounting structure including a floor panel on which a seatbelt anchor is mounted, a cross member disposed below the floor panel, and a reinforcement disposed below the floor panel and fixed to the seatbelt anchor together with the floor panel. In the technique disclosed in the above publication, the reinforcement is fixed to the cross member only at a position above the anchor attachment point.

However, in the technique disclosed in the above publication, since the reinforcement is fixed to the cross member only at a position above the anchor attachment point, when there is an input to the seatbelt anchor and a load is applied to the floor panel and the reinforcement, the load is transmitted to the cross member only through the path above the anchor attachment point. It is thud difficult to distribute and transmit the load to the cross member. Therefore, it is difficult to suppress deformation of the reinforcement and the floor panel, and it is necessary to significantly increase the size of the reinforcement or to provide a bead for suppressing occurrence of wrinkles in the floor panel.

SUMMARY

An object of the present disclosure is to provide a seatbelt anchor mounting structure that can distribute and transmit a load to a cross member when the load is applied to a floor panel and a reinforcement.

A seatbelt anchor mounting structure according to a first aspect of the present disclosure includes: a floor panel on which a seatbelt anchor is mounted; a cross member disposed below the floor panel; and a reinforcement disposed below the floor panel and fixed to the seatbelt anchor together with the floor panel. Here, the reinforcement is fixed to the cross member at a position above an anchor mounting point that is a mounting point of the seatbelt anchor on the floor panel, and is fixed to the cross member at a position below the anchor mounting point.

According to such a configuration, the reinforcement is fixed to the cross member at a position above the anchor mounting point, and is fixed to the cross member at a position below the anchor mounting point. Therefore, when there is an input to the seatbelt anchor and a load is applied to the floor panel and the reinforcement, the load can be transmitted to the cross member through both a path passing above the anchor mounting point and a path passing below the anchor mounting point. That is, the load can be distributed and transmitted to the cross member. Therefore, deformation of the reinforcement and the floor panel can be suppressed. As a result, a large increase in the size of the reinforcement is unnecessary. In addition, it is not necessary to set a bead for suppressing wrinkles on the floor panel, and it is possible to suppress deterioration of moldability of the floor panel or restriction of shape due to the setting of the bead.

In the seatbelt anchor mounting structure according to the first aspect, the floor panel may include a first floor surface portion, a floor inclined surface portion rising from a vehicle rear side end portion of the first floor surface portion toward a vehicle rear side and an upper side, and a second floor surface portion extending from an upper end portion of the floor inclined surface portion toward the vehicle rear side, and the seatbelt anchor may be mounted on the floor inclined surface portion.

The cross member may include a bottom wall disposed below and on the vehicle rear side of the anchor mounting point, a front wall extending upward from a vehicle front side end portion of the bottom wall, a rear side wall extending upward from a vehicle rear side end portion of the bottom wall, a front flange extending toward a vehicle front side from an upper end portion of the front wall and disposed above and on the vehicle rear side of the anchor mounting point, and a rear flange extending toward the vehicle rear side from an upper end portion of the rear side wall, and the cross member may be fixed to the second floor surface portion by the front flange and the rear flange from below. The reinforcement may be fixed to the front flange of the cross member and may be fixed to the bottom wall of the cross member.

According to such a configuration, the reinforcement is fixed to the front flange of the cross member positioned above and on the vehicle rear side of the anchor mounting point, and is fixed to the bottom wall of the cross member positioned below and on the vehicle rear side of the anchor mounting point. Thus, the reinforcement can be fixed to the cross member at both a position above and below the anchor mounting point.

In the seatbelt anchor mounting structure according to the first aspect, the reinforcement may include a front wall, an upper wall, and a lower wall vertically facing the upper wall. The reinforcement may be fixed to the seatbelt anchor together with the floor panel at the front wall, may be fixed to the front flange of the cross member at the upper wall, and may be fixed to the bottom wall of the cross member at the lower wall.

According to such a configuration, the reinforcement has a front wall, an upper wall, and a lower wall, and is fixed to the seatbelt anchor together with the floor panel at the front wall, is fixed to the front flange of the cross member at the upper wall, and is fixed to the bottom wall of the cross member at the lower wall. Thus, the reinforcement can be fixed to the cross member at both a position above and below the anchor mounting point.

In the seatbelt anchor mounting structure according to the first aspect, the lower wall of the reinforcement may be provided with a working hole that penetrates the lower wall, and the working hole may be closed by a cover.

According to such a configuration, a working hole that penetrates the lower wall is provided in the lower wall of the reinforcement. Therefore, even when the reinforcement has the lower wall, a welding gun can access the fixing position through the working hole during the fixing (welding) operation of the front flange of the cross member and the upper wall of the reinforcement and/or the floor panel.

Further, since the work hole is closed by the cover, after the fixing (welding) operation of the front flange of the cross member and the upper wall of the reinforcement and/or the floor panel, it is possible to suppress water outside the vehicle from entering the upper side of the lower wall from the work hole.

In the seatbelt anchor mounting structure according to the first aspect, the floor panel and the reinforcement may be fixed to the seatbelt anchor using an anchor mounting bolt passing through the anchor mounting point. The reinforcement may further include a right wall and a left wall. The lower wall, the right wall, and the left wall of the reinforcement may cover the anchor mounting bolt from below and a vehicle right-left direction.

According to such a configuration, the lower wall, the right wall, and the left wall of the reinforcement cover the anchor mounting bolt from below and the vehicle right-left direction. Therefore, it is possible to suppress water outside the vehicle from entering the vehicle cabin through the hole through which the anchor mounting bolt is inserted, from below and the vehicle right-left direction.

In the seatbelt anchor mounting structure according to the first aspect, the reinforcement may be fixed to the front flange of the cross member also at the right wall and the left wall.

According to such a configuration, since the reinforcement is fixed to the front flange of the cross member also at the right wall and the left wall, it is possible to strengthen the fixing between the reinforcement and the front flange of the cross member as compared to the case where the reinforcement is not fixed to the front flange of the cross member at the right wall and the left wall.

The seatbelt anchor mounting structure according to the first aspect may further include a sealing material extending continuously over an entire circumference. The sealing material may be disposed between the lower wall, the right wall, and the left wall of the reinforcement, and the floor panel, and may be disposed between the lower wall, the right wall, and the left wall of the reinforcement, and the cross member.

According to such a configuration, the sealing material is disposed between the lower wall, the right wall, and the left wall of the reinforcement, and the floor panel, and between the lower wall, the right wall, and the left wall of the reinforcement, and the cross member. It is thus possible to suppress water outside the vehicle from entering the upper side of the lower wall from between these portions. Therefore, it is possible to suppress water outside the vehicle from entering the vehicle cabin through the hole through which the anchor mounting bolt is inserted.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
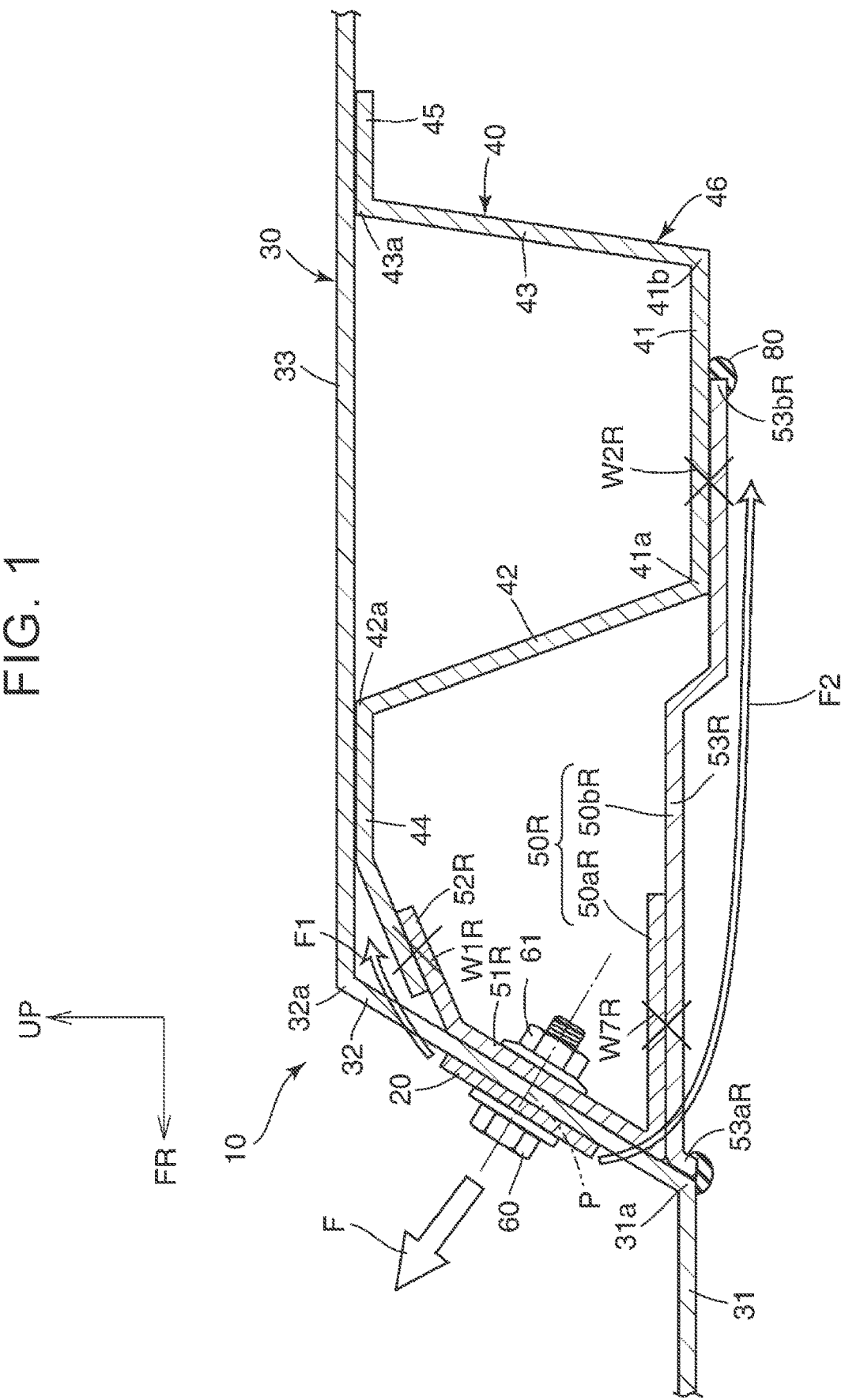
FIG. 1 is a cross-sectional view of a seatbelt anchor mounting structure according to an embodiment of the present disclosure.

Hereinafter, a seatbelt anchor mounting structure (hereinafter, also simply referred to as a mounting structure) 10 according to an embodiment of the present disclosure will be described with reference to the drawings. In the drawings, UP indicates the upper side of the vehicle, and FR indicates the front side of the vehicle.

As shown in FIG. 1, the mounting structure 10 includes a floor panel 30 to which the seat belt anchor 20 is attached, a cross member 40 disposed on the lower side of the floor panel 30, and a reinforcement 50 disposed on the lower side of the floor panel 30 and fixed to the seat belt anchor 20 together with the floor panel 30.

The floor panel 30 may be referred to as a floor pan. The floor panel 30 includes a first floor surface portion 31 that extends in a substantially horizontal direction, a floor inclined surface portion 32 that rises from the vehicle rear side end portion 31a of the first floor surface portion 31 to the vehicle rear side and the upper side, and a second floor surface portion 33 that extends in a substantially horizontal direction from the upper end portion (vehicle rear side end portion) 32a of the floor inclined surface portion 32 to the vehicle rear side.

The seat belt anchor 20 is fixedly attached to the floor inclined surface portion 32 of the floor panel 30 using an anchor mounting bolt 60 that passes through an anchor attachment point P that is an attachment point of the seat belt anchor 20 to the floor panel 30. The anchor attachment point P is located at the center of a hole (not shown) formed in the floor inclined surface portion 32 for insertion of the anchor mounting bolt 60. The seat belt anchor 20 is a plate-like member that supports a seat belt (not shown), and two are disposed at intervals in the vehicle left-right direction for one seat belt device.

The cross member 40 is provided so as to extend in the vehicle left-right direction, and has a hat shape in a cross-sectional view. The cross member 40 has a bottom wall 41, a front side wall 42 extending upward from the vehicle front side end portion 41a of the bottom wall 41, a rear side wall 43 extending upward from the vehicle rear side end portion 41b of the bottom wall 41, a front flange 44 extending from the upper end portion 42a of the front side wall 42 toward the vehicle front side, and a rear flange 45 extending from the upper end portion 43a of the rear side wall 43 toward the vehicle rear side. The cross member 40 is fixed by being welded from below to the second floor surface portion 33 by the front flange 44 and the rear flange 45, and forms a closed section portion 46 which is a closed section in a cross-sectional view with the second floor surface portion 33. The bottom wall 41 of the cross member 40 is below the anchor attachment point P and on the vehicle rear side, and the front flange 44 of the cross member 40 is above the anchor attachment point P and on the vehicle rear side.

Figure 2:
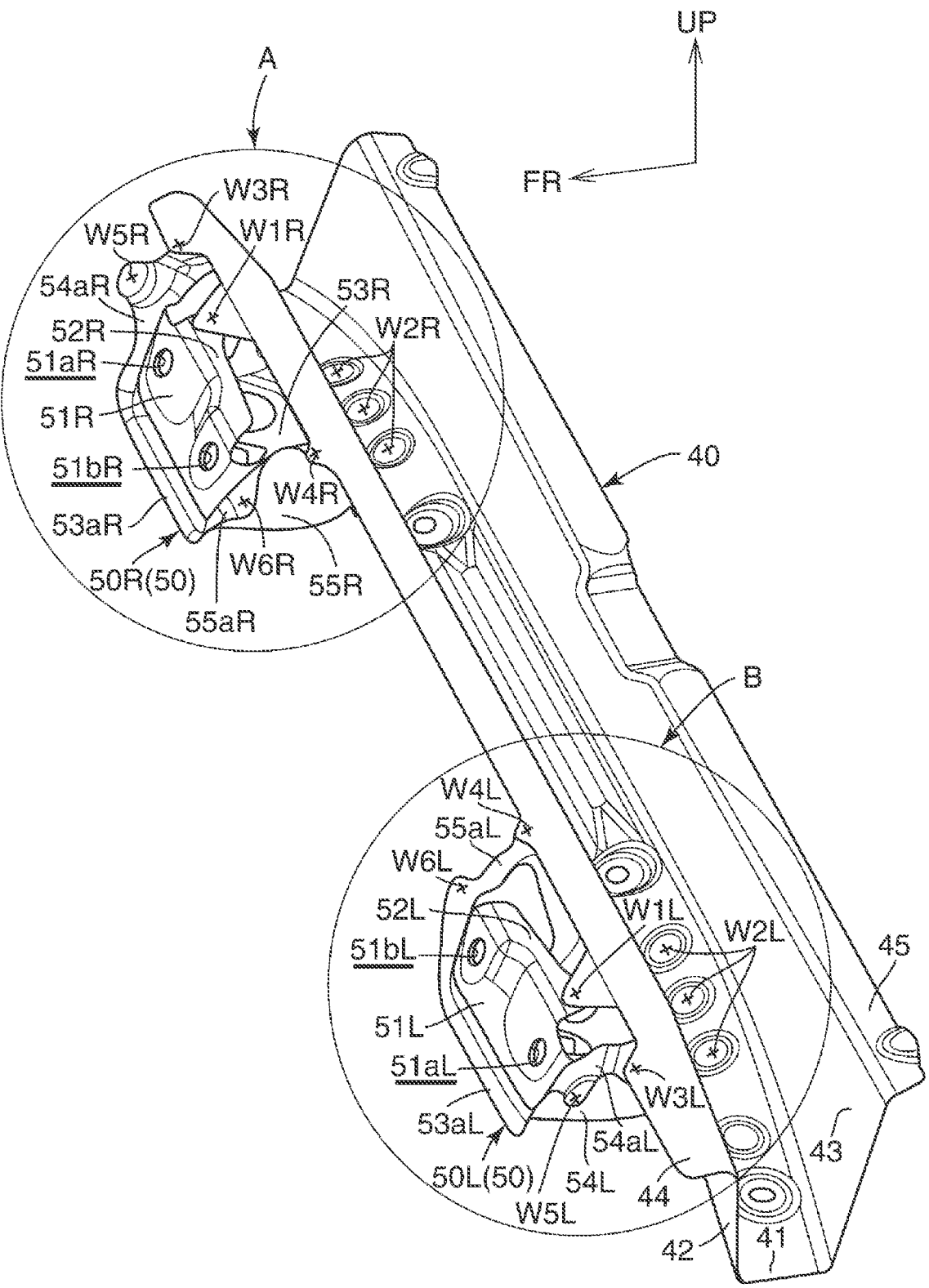
FIG. 2 is a perspective view of only the reinforcement and cross member of the seatbelt anchor mounting structure of the present embodiment.

The reinforcement 50 corresponds to the seat belt anchor 20, and as shown in FIG. 2, a total of two of the reinforcement 50R provided in the A portion and the reinforcement 50L provided in the B portion are provided at intervals in the vehicle-left-right direction for one seat belt device. The reinforcement 50L has the same configuration except that it is symmetrical to the reinforcement 50R. Therefore, in the present embodiment will be described reinforcement 50R, for the reinforcement 50L, members corresponding to the reinforcement 50R, and a sign of changing the R of the same reference numeral to L to the site, the description thereof will be omitted.

Figure 6:
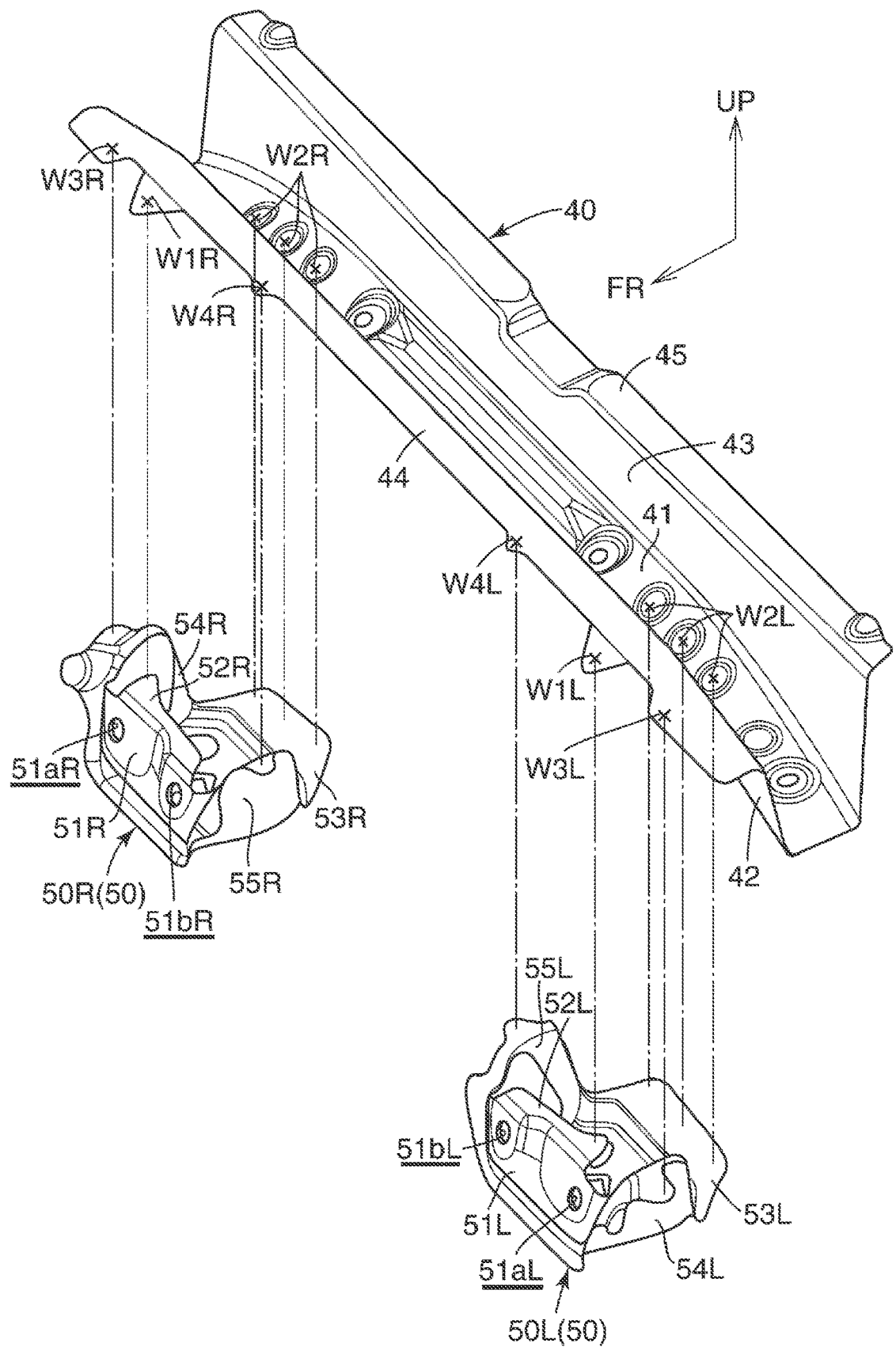
FIG. 6 is an exploded perspective view of only the reinforcement and the cross member of the seatbelt anchor mounting structure of the embodiment of the present disclosure.

As illustrated in FIG. 1, the reinforcement 50R is disposed below the floor panel 30, and is fixed to the seat belt anchor 20 together with the floor panel 30. The reinforcement 50R is fixed to the seat belt anchor 20 together with the floor panel 30 by screwing the anchor mounting bolt 60 into a weld nut 61 fixed to the reinforcement 50R. The anchor mounting bolt 60 is inserted into a hole provided in each of the seat belt anchor 20, the floor panel 30, and the reinforcement 50R. In the illustrated embodiment, only the hole 51aR provided in the reinforcement 50R among the bolt-insertion holes provided in the seat belt anchor 20, the floor panel 30, and the reinforcement 50R are illustrated in FIGS. 2, 3, and 6.

The reinforcement 50R has a front wall 51R, an upper wall 52R, a lower wall 53R, a right wall 54R, and a left wall 55R, and is generally box-shaped to open to the rear side of the vehicle.

As shown in FIG. 1, the front wall 51R is disposed so as to overlap the floor inclined surface portion 32 from the lower side (the rear side of the vehicle). The reinforcement 50R is fixed to the seat belt anchor 20 together with the floor panel 30 on the front wall 51R. A hole 51aR (FIG. 3) through which the anchor mounting bolt 60 is inserted is formed on the front wall 51R, and the weld nut 61 is fixed.

Figure 3:
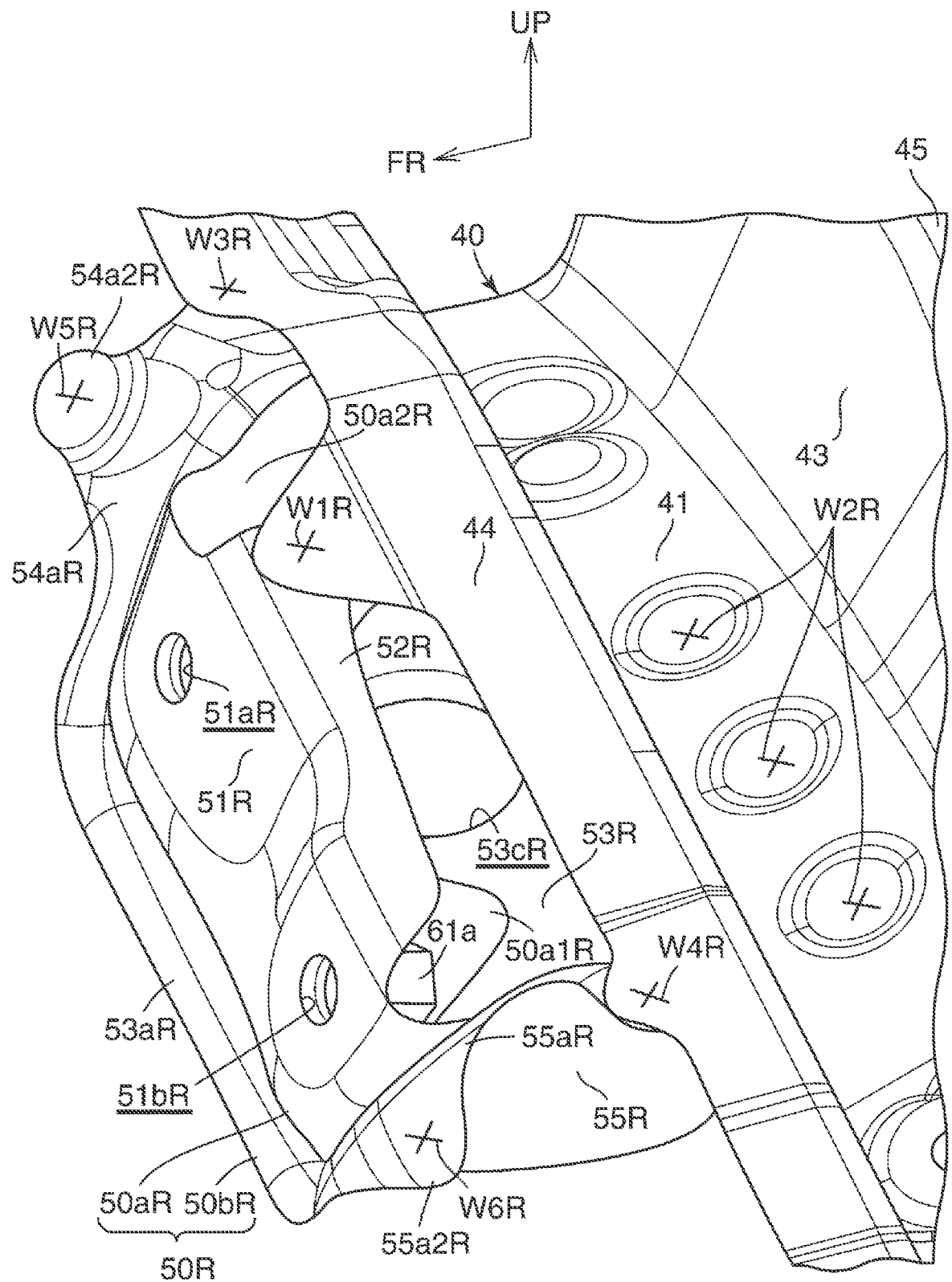
FIG. 3 is an enlarged perspective view of the seatbelt anchor mounting structure of the embodiment of the present disclosure in the section A of FIG. 2.
Figure 4:
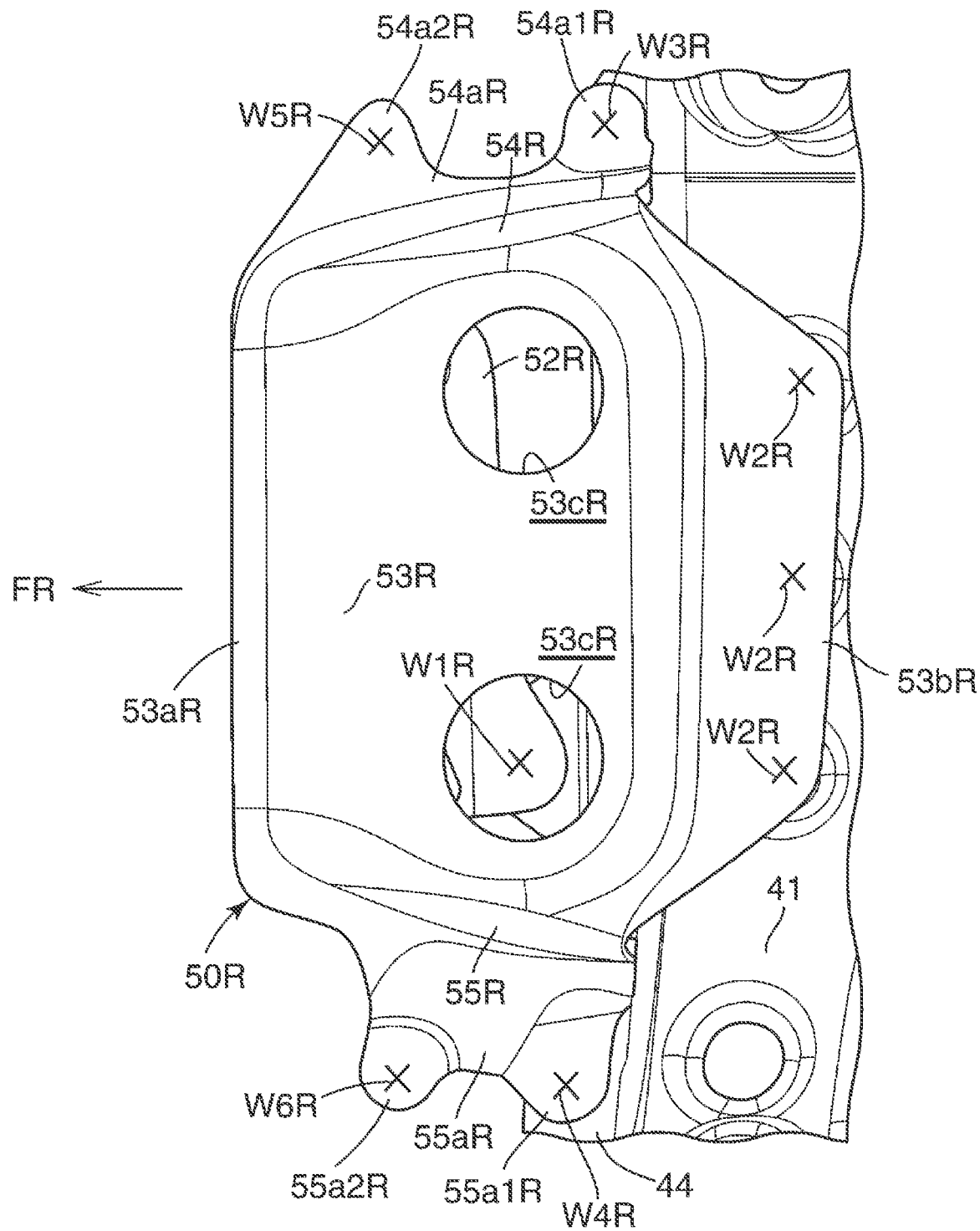
FIG. 4 is an enlarged bottom view of the seatbelt anchor mounting structure of the embodiment of the present disclosure in the section A of FIG. 2.

As shown in FIG. 3, a second hole 51bR is further formed in the front wall 51R, and the second well nut 61a is fixed thereto. The second hole 51bR and the second well nut 61a are provided to fix the reinforcement 50R together with the floor panel 30 to a seat rail (not shown) using bolts (not shown).

Returning to FIG. 1, the upper wall 52R is bent from the upper end portion of the front wall 51R and extends to the rear side of the vehicle. The upper wall 52R is above the anchor attachment point P. The reinforcement 50R is fixed to the front flange 44 of the cross member 40 by spot-welding or the like on the upper wall 52R. The fixing W1R between the upper wall 52R and the front flange 44 may be only one position or a plurality of positions.

The lower wall 53R extends from a lower end portion of the front wall 51R or a vicinity thereof to a rear side of the vehicle. The lower wall 53R is below the anchor attachment point P. The lower wall 53R is positioned below the upper wall 52R and is positioned vertically opposite to the upper wall 52R. The vehicle-front-side end portion 53aR of the lower wall 53R is located at a position contacting or close to the floor inclined surface portion 32 or the first floor surface portion 31. When the vehicle front-side end portion 53aR of the lower wall 53R is in contact with or close to the floor inclined surface portion 32 instead of the first floor surface portion 31, the vehicle front-side end portion 53aR of the lower wall 53R is bent downward. The vehicle-rear-side end portion 53bR of the lower wall 53R is disposed so as to overlap the bottom wall 41 of the cross member 40 from the lower side. The reinforcement 50R is fixed to the bottom wall 41 of the cross member 40 by spot-welding or the like in the lower wall 53R. The fixing W2R between the lower wall 53R and the bottom wall 41 may be only one place, or may be a plurality of places (three places in the illustrated embodiment) in the lateral direction of the vehicle.

Figure 5:
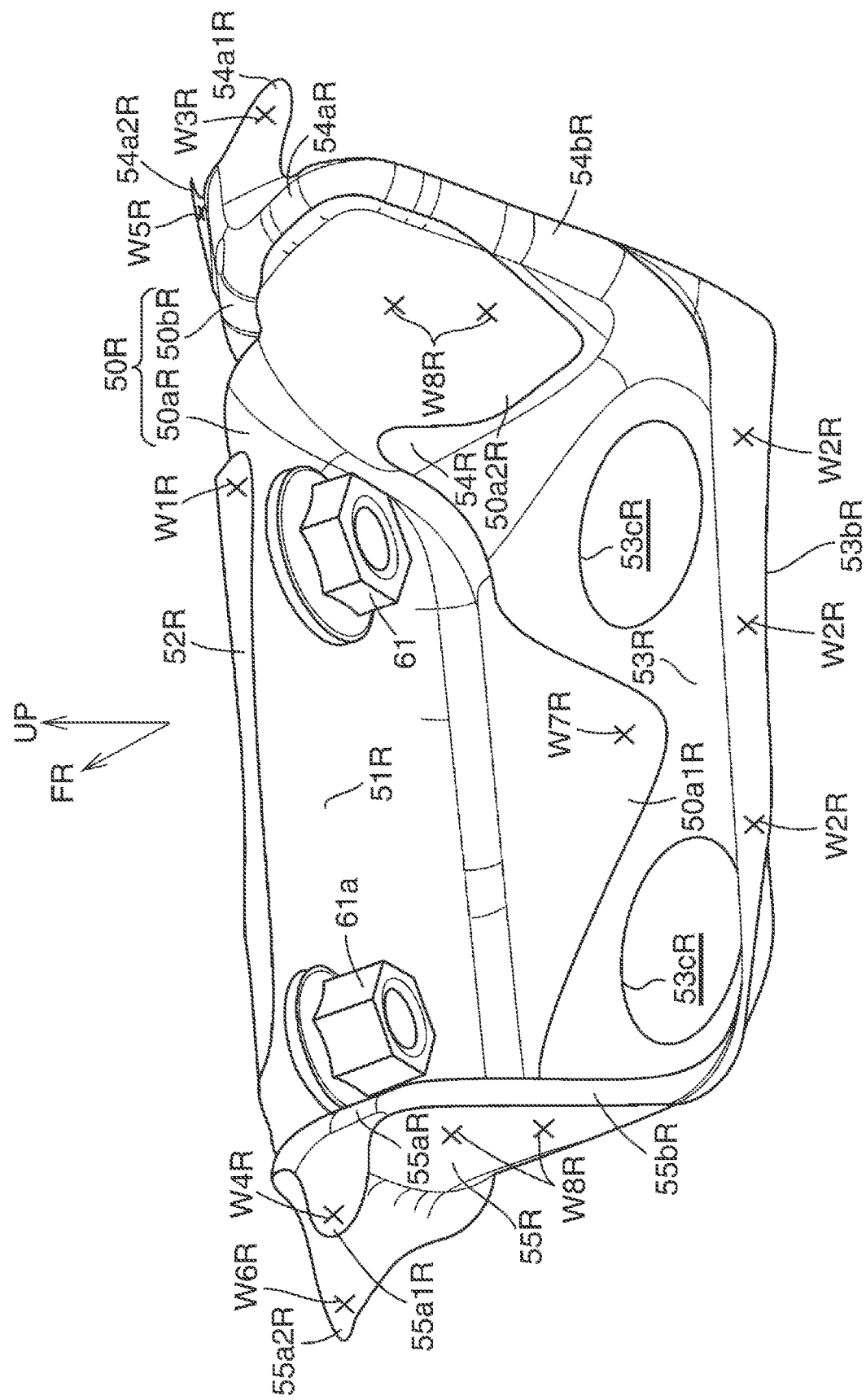
FIG. 5 is a perspective view of the reinforcement in the seatbelt anchor mounting structure according to the embodiment of the present disclosure when viewed from the rear side of the vehicle.

As illustrated in FIG. 5, the right wall 54R and the left wall 55R are provided at positions facing each other in the vehicle-left-right direction. The right wall 54R extends from the vehicle right side end portion of the front wall 51R or the vicinity thereof toward the vehicle rear side, and extends upward from the vehicle right side end portion of the lower wall 53R. The left wall 55R extends from the vehicle left end portion of the front wall 51R or the vicinity thereof toward the vehicle rear side, and extends upward from the vehicle left end portion of the lower wall 53R. The right wall 54R and the left wall 55R are located above the lower wall 53R and on the vehicle front side from the front side wall 42 of the cross member 40 on the vehicle rear side from the floor inclined surface portion 32 of the floor panel 30 when viewed from the vehicle left-right direction.

The upper end 54aR of the right wall 54R and the front end of the vehicle are bent to the right side of the vehicle. The end portion 54aR of the right wall 54R has a right extending portion 54a1R extending to the right side of the vehicle in a part of the vehicle front-rear direction. The reinforcement 50R is fixed to the front flange 44 of the cross member 40 by spot-welding or the like at the right extension portion 54a1R. The upper end portion 55aR of the left wall 55R and the front end portion of the vehicle are bent to the left side of the vehicle. The end portion 55aR of the left wall 55R has a left extending portion 55a1R extending to the left side of the vehicle in a part of the vehicle front-rear direction. The reinforcement 50R is fixed to the front flange 44 of the cross member 40 by spot-welding or the like on the left-extending portion 55a1R. The fixing W3R between the right extending portion 54a1R and the front flange 44, and the fixing W4R between the left extending portion 55a1R and the front flange 44 may be only one or a plurality of positions, respectively.

The end portion 54aR of the right wall 54R has a second right extending portion 54a2R extending to the vehicle right side at a position on the vehicle front side from the right extending portion 54a1R. The reinforcement 50R is fixed to the floor inclined surface portion 32 or the second floor surface portion 33 of the floor panel 30 by spot-welding or the like at the second right-extending portion 54a2R. The end portion 55aR of the left wall 55R has a second left extending portion 55a2R extending to the vehicle left side at a position closer to the vehicle front side than the left extending portion 55a1R. The reinforcement 50R is fixed to the floor inclined surface portion 32 or the second floor surface portion 33 of the floor panel 30 by spot-welding or the like at the second left-extending portion 55a2R. The fixing W5R between the second right extending portion 54a2R and the floor panel 30, and the fixing W6R between the second left extending portion 55a2R and the floor panel 30 may be only one position or a plurality of positions, respectively.

The vehicle rear end portion 54bR of the right wall 54R is bent to the vehicle right side. The vehicle rear end 54bR of the right wall 54R is in a position contacting or proximate to the front side wall 42 of the cross member 40. The vehicle rear-side end portion 55bR of the left wall 55R is bent to the vehicle left side. The vehicle rear end 55bR of the left wall 55R is in a position contacting or proximate to the front side wall 42 of the cross member 40.

Figure 7:
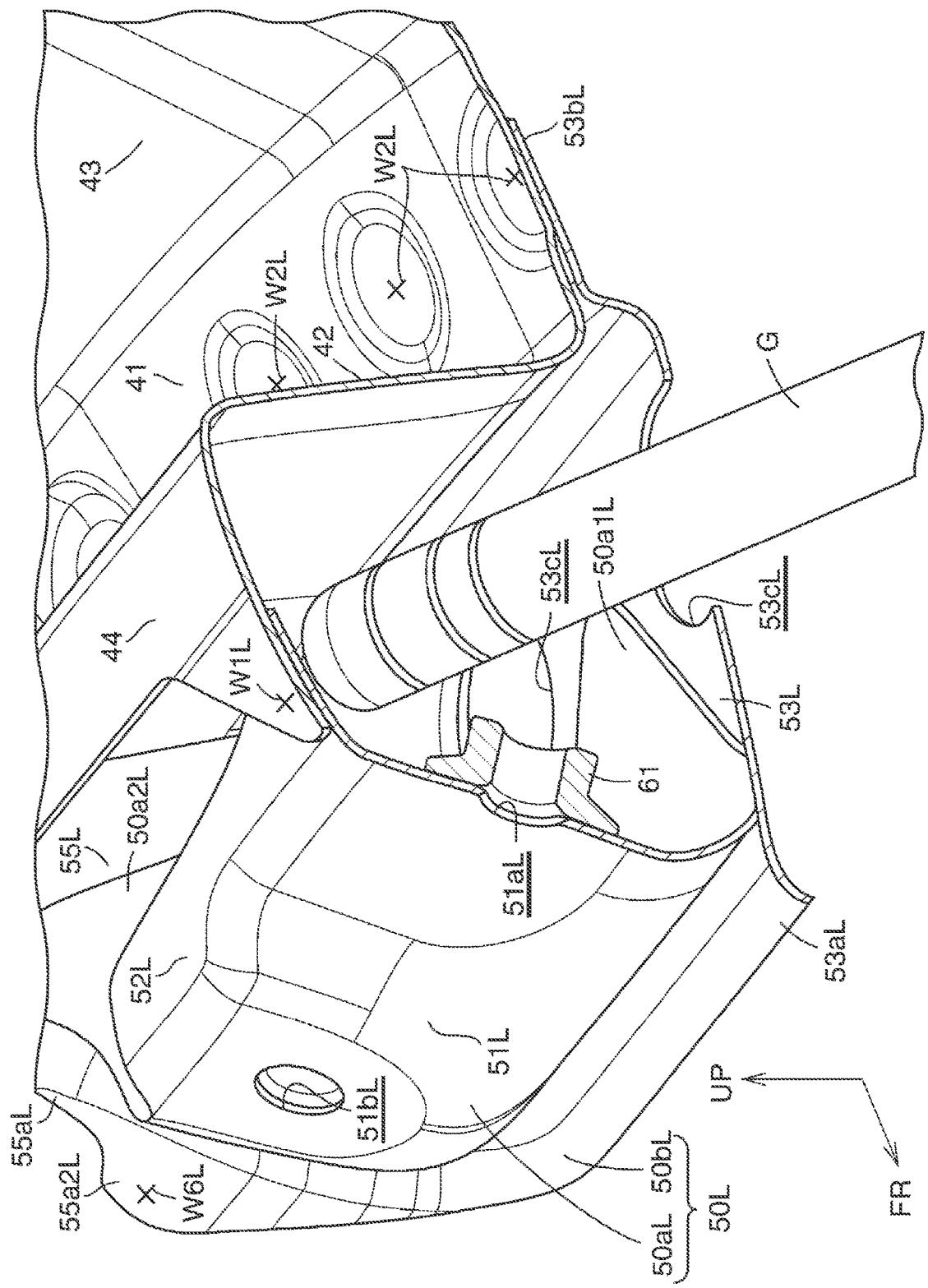
FIG. 7 is an enlarged perspective view of the seatbelt anchor mounting structure of the embodiment of the present disclosure when the welding gun is accessed to a fixed (welded) position through the working hole of the reinforcement in the portion B of FIG. 2.
Figure 8:
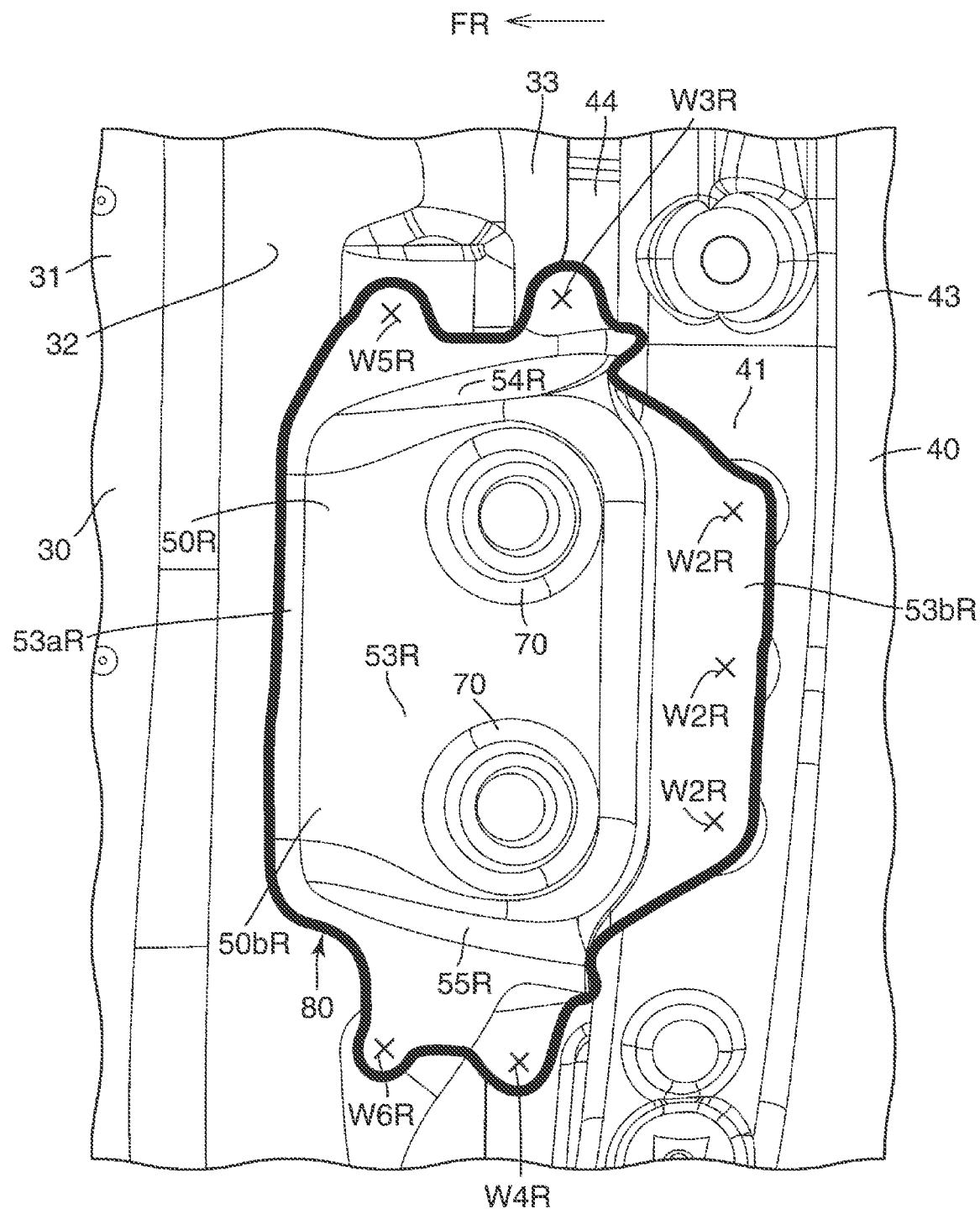
FIG. 8 is an enlarged bottom view of a seatbelt anchor mounting structure according to an embodiment of the present disclosure.

The lower wall 53R, the right wall 54R, and the left wall 55R cover the anchor mounting bolt 60 and the weld nut 61 from the lower side and the vehicle left-right direction. At least one working hole 53cR penetrating the lower wall 53R is formed in the lower wall 53R. In the illustrated embodiment, two working holes 53cR are formed in the left-right direction of the vehicle. The working hole 53cR is provided to enable fixing (welding) of the front flange 44 of the cross member 40 and the reinforcement 50R and/or the floor panel 30 with the welding gun G (FIG. 7), even if the reinforcement 50R has a lower wall 53R, a right wall 54R and a left wall 55R. In FIG. 7, the reinforcement 50L is shown instead of the reinforcement 50R in order to clearly illustrate the fixing operation using the welding gun G. As shown in FIG. 8, the working hole 53cR is closed by a cover 70 made of a grommet or the like in order to suppress water outside the vehicle from entering the upper side of the lower wall 53R through the working hole 53cR after the fixing (welding) operation.

A sealing material 80 extending continuously over the entire circumference is disposed between the lower wall 53R, the right wall 54R, the left wall 55R, and the floor panel 30 and between the lower wall 53R, the right wall 54R, and the left wall 55R and the cross member 40. The sealing material 80 is provided between the reinforcement 50R and the floor panel 30 and between the reinforcement 50R and the cross member 40 so as to suppress water outside the vehicle from entering the upper side of the lower wall 53R.

The reinforcement 50R may be a one-piece configuration or a multi-piece configuration. In the illustrated embodiment, the reinforcement 50R is a two-component configuration of the first component 50aR and the second component 50bR.

As shown in FIG. 5, each of the first component 50aR and the second component 50bR is a sheet metal press-formed product. The first component 50aR constitutes a front wall 51R and an upper wall 52R of the reinforcement 50R. The second component 50bR constitutes a lower wall 53R, a right wall 54R, and a left wall 55R of the reinforcement 50R. The first component 50aR has a front wall 51R including a first rear extending portion 50a1R extending from a lower end portion of a portion of the front wall 51R toward a vehicle rear side, and a second rear extending portion 50a2R extending from respective end portions of the portion of the front wall 51R toward the vehicle rear side from the vehicle right side and the left side. The first component 50aR is fixed to the second component 50bR by spot-welding or the like at the first rear extension 50a1R and the second rear extension 50a2R. The fixing W7R between the first rear extending portion 50a1R and the second component 50bR may be only one position or a plurality of positions. The fixing W8R between the second rear extending portion 50a2R and the second component 50bR may be only one position or a plurality of positions.

As described above, the second component 50bR constitutes the lower wall 53R, the right wall 54R, and the left wall 55R of the reinforcement 50R. A sealing material 80 (FIG. 8) extending continuously over the entire circumference is disposed between the lower wall 53R, the right wall 54R, the left wall 55R, and the floor panel 30 and between the lower wall 53R, the right wall 54R, and the left wall 55R and the cross member 40. Therefore, the sealing material 80 is continuously provided over the entire periphery of the edge of the second component 50bR, and seals between the second component 50bR and the floor panel and the cross member 40.

Next, operations and effects of the embodiment of the present disclosure will be described.

(A) The reinforcement 50R is fixed to the cross member 40 at a position above the anchor attachment point P, and is fixed to the cross member 40 at a position below the anchor attachment point P. Therefore, when there is an input F (FIG. 1) to the vehicle front side to the seat belt anchor 20 at the time of a front collision or the like of the vehicle and a tensile load to the vehicle front side is applied to the floor panel 30 and the reinforcement 50R, the load can be transmitted to the cross member 40 through both a path passing above the anchor attachment point P and a path passing below (arrow F1, F2 in FIG. 1). That is, the load can be distributed and transmitted to the cross member 40. Therefore, deformation of the reinforcement 50R and the floor panel 30 can be suppressed. Consequently, a large increase in the size of the reinforcement 50R is not required. In addition, it becomes unnecessary to set a bead for suppressing wrinkles in the floor panel 30, and it is possible to suppress deterioration of moldability of the floor panel 30 or restriction of shape due to the bead setting.

(B) Reinforcement 50R is fixed to the front flange 44 of the cross member at a position above the anchor attachment point P and the vehicle rear side, since it is fixed to the bottom wall 41 of the cross member 40 at a position below the anchor attachment point P and the vehicle rear side, the reinforcement 50R can be fixed to the cross member 40 at both a position above and a position below the anchor attachment point P.

(C) The reinforcement 50R has a front wall 51R, an upper wall 52R, and a lower wall 53R, and is fixed to the seat belt anchor 20 together with the floor panel 30 at the front wall 51R, is fixed to the front flange 44 of the cross member 40 at the upper wall 52R, and is fixed to the bottom wall 41 of the cross member 40 at the lower wall 53R, so that the reinforcement 50R can be fixed to the cross member 40 at both positions above and below the anchor attachment point P.

(D) The reinforcement 50R has a front wall 51R, an upper wall 52R, and a lower wall 53R, and is fixed to the seat belt anchor 20 together with the floor panel 30 on the front wall 51R, is fixed to the front flange 44 of the cross member 40 on the upper wall 52R, and is fixed to the bottom wall 41 of the cross member 40 on the lower wall 53R, so that a load can be transmitted from the reinforcement 50R to not only the front flange 44 but also the bottom wall 41 of the cross member 40. Therefore, there is no need for a stiffener or the like that connects the front flange 44 and the rear flange 45 of the cross member 40, and the weight of the mounting structure 10 can be reduced.

(E) Since the lower wall 53R of the reinforcement 50R has a working hole 53cR that penetrates the lower wall 53R, the welding gun G (FIG. 7) can be accessed through the working hole 53cR to a fixed position during a fixing (welding) operation of the front flange 44 of the cross member 40 and the upper wall 52R and/or the floor panel 30 of the reinforcement 50R even when the reinforcement 53 has a lower wall 53R.

(F) Since the working hole 53cR is closed by the cover 70 (FIG. 8), water outside the vehicle can be prevented from entering from the working hole 53cR to the upper side of the lower wall 53R after the fixing (welding) operation of the front flange 44 of the cross member 40 and the upper wall 52R and/or the floor panel 30 of the reinforcement 50R. Therefore, it is possible to prevent water outside the vehicle from entering the vehicle cabin through the hole through which the anchor mounting bolt 60 is inserted.

(G) The lower wall 53R, the right wall 54R, and the left wall 55R of the reinforcement 50R cover the anchor mounting bolt 60 from the lower side and the left-right direction of the vehicle. Therefore, it is possible to prevent water outside the vehicle from entering the vehicle cabin through the hole through which the anchor mounting bolt 60 is inserted from the lower side and the vehicle left-right direction.

(H) Since the reinforcement 50R is fixed to the front flange 44 of the cross member 40 even in the right wall 54R and the left wall 55R, it is possible to secure the reinforcement 50R and the front flange 44 of the cross member 40 more firmly than when the reinforcement 50R is not fixed to the front flange 44 of the cross member 40 in the right wall 54R and the left wall 55R.

Figure 9:
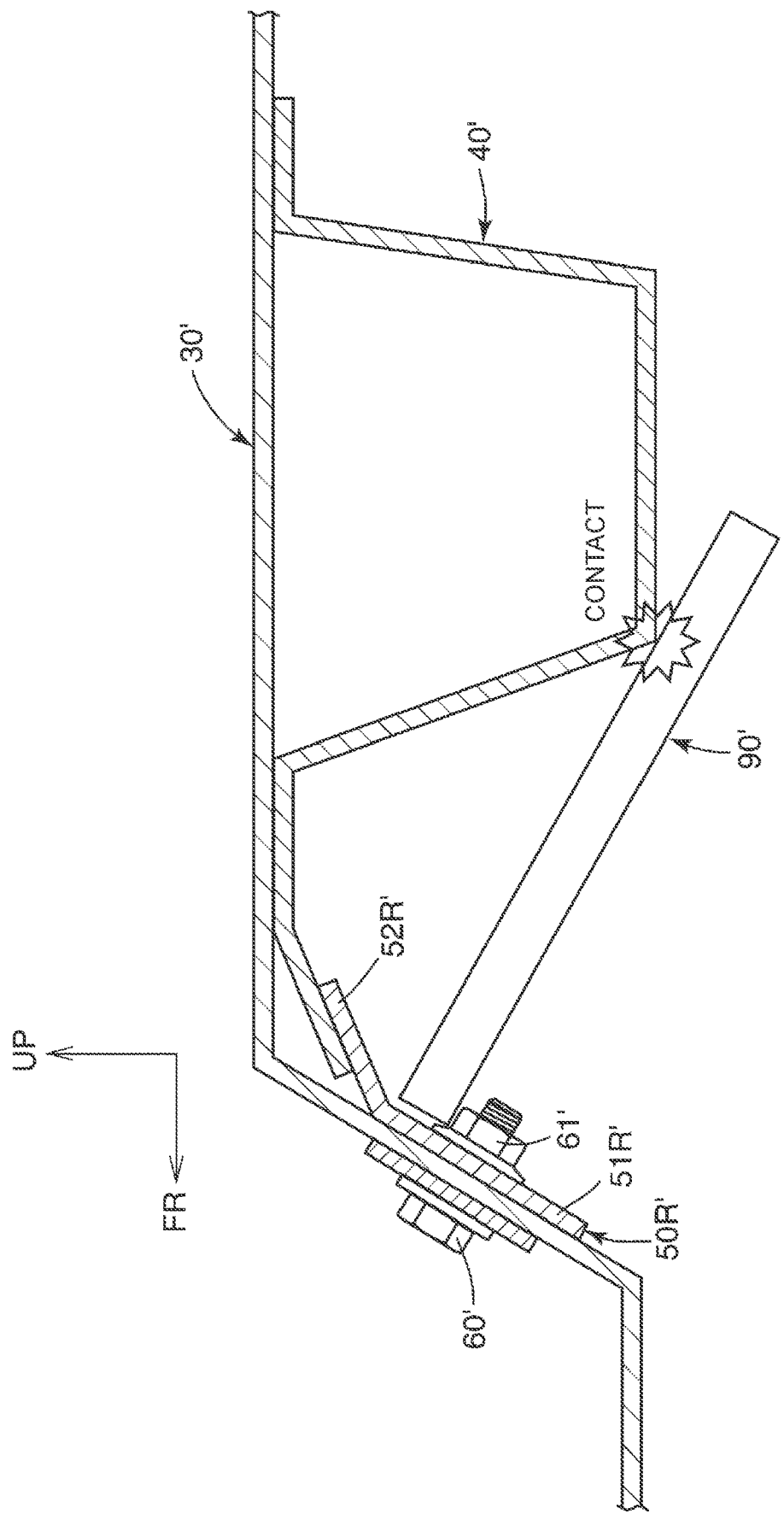
FIG. 9 is a cross-sectional view of a seatbelt anchor mounting structure of a comparative example of an embodiment of the present disclosure (which differs from the embodiment of the present disclosure).

(I) FIG. 9 shows a comparative example of an embodiment of the present disclosure different from the embodiment of the present disclosure. In the comparative example, a case where the lower wall 53R, the right wall 54R, and the left wall 55R are not provided in the reinforcement 50R of the embodiment of the present disclosure is shown. In the comparative example, since other configurations are the same as those of the embodiment of the present disclosure, members corresponding to the embodiment of the present disclosure will be described with the same reference numerals (dashes).

In the comparative example, since the reinforcement 50R' does not have the lower wall 53R, the right wall 54R, and the left wall 55R unlike the reinforcement 50R of the embodiment of the present disclosure, in order to suppress water outside the vehicle from entering the vehicle cabin through the hole through which the anchor mounting bolt 60' is inserted, the sealing material needs to be applied to the weld nut 61' fixed to the reinforcement 50R' by using the sealer gun 90'. However, depending on the positional relationship between the cross member 40' and the weld nut 61', the sealer gun 90' may come into contact with the cross member 40', making it difficult to apply the sealing material by the sealer gun 90'. In order to suppress this possibility, there is a possibility that restrictions are imposed on the position of the weld nut 61', the shape of the cross member 40', and the like (structure).

However, in the present embodiment, the sealing material 80 is disposed between the lower wall 53R, the right wall 54R, the left wall 55R, and the floor panel 30, and between the lower wall 53R, the right wall 54R, and the left wall 55R and the cross member 40. Therefore, it is possible to suppress water outside the vehicle from entering the upper side of the lower wall 53R from between them. Therefore, it is possible to suppress water outside the vehicle from entering the vehicle cabin through the hole through which the anchor mounting bolt 60 is inserted.

In this structure, since it is unnecessary to apply the sealing material to the weld nut 61, it is possible to prevent the position of the weld nut 61 and the shape (structure) of the cross member 40 from being restricted in order to apply the sealing material 80.

What is claimed is:

1. A seatbelt anchor mounting structure comprising:
a floor panel on which a seatbelt anchor is mounted;
a cross member disposed below the floor panel; and
a reinforcement disposed below the floor panel and fixed to the seatbelt anchor together with the floor panel, wherein the reinforcement is fixed to the cross member at a position above an anchor mounting point that is a mounting point of the seatbelt anchor on the floor panel, and is fixed to the cross member at a position below the anchor mounting point, wherein:
the floor panel includes a first floor surface portion, a floor inclined surface portion rising from a vehicle rear side end portion of the first floor surface portion toward a vehicle rear side and an upper side, and a second floor surface portion extending from an upper end portion of the floor inclined surface portion toward the vehicle rear side, and the seatbelt anchor is mounted on the floor inclined surface portion;
the cross member includes a bottom wall disposed below and on the vehicle rear side of the anchor mounting point, a front wall extending upward from a vehicle front side end portion of the bottom wall, a rear side wall extending upward from a vehicle rear side end portion of the bottom wall, a front flange extending toward a vehicle front side from an upper end portion of the front wall and disposed above and on the vehicle rear side of the anchor mounting point, and a rear flange extending toward the vehicle rear side from an upper end portion of the rear side wall, and the cross member is fixed to the second floor surface portion by the front flange and the rear flange from below;
the reinforcement includes a front wall, an upper wall, and a lower wall vertically facing the upper wall; and
the reinforcement is fixed to the seatbelt anchor together with the floor panel at the front wall, is fixed to the front flange of the cross member at the upper wall, and is fixed to the bottom wall of the cross member at the lower wall.

2. The seatbelt anchor mounting structure according to claim 1, wherein the lower wall of the reinforcement is provided with a working hole that penetrates the lower wall, and the working hole is closed by a cover.

3. The seatbelt anchor mounting structure according to claim 1, wherein:
the floor panel and the reinforcement are fixed to the seatbelt anchor using an anchor mounting bolt passing through the anchor mounting point;
the reinforcement further includes a right wall and a left wall; and
the lower wall, the right wall, and the left wall of the reinforcement cover the anchor mounting bolt from below and a vehicle right-left direction.

4. The seatbelt anchor mounting structure according to claim 3, wherein the reinforcement is fixed to the front flange of the cross member also at the right wall and the left wall.

5. The seatbelt anchor mounting structure according to claim 3, further comprising a sealing material extending continuously over an entire circumference, wherein the sealing material is disposed between the lower wall, the right wall, and the left wall of the reinforcement, and the floor panel, and is disposed between the lower wall, the right wall, and the left wall of the reinforcement, and the cross member.

* * * * *